United States Patent [19]
Sobeck et al.

[11] Patent Number: 6,030,101
[45] Date of Patent: Feb. 29, 2000

[54] VEHICLE FASCIA ASSEMBLY INCLUDING A MOUNTING MEMBER FOR DEFLECTABLY ATTACHING A LAMP

[75] Inventors: Earl R. Sobeck, Dearborn Heights; Gerald C. Dermidoff, Sterling Heights; Robert E. Senger, Jr., Pontiac, all of Mich.

[73] Assignee: Chrysler Corporation, Auburn Hills, Mich.

[21] Appl. No.: 08/990,438

[22] Filed: Dec. 15, 1997

[51] Int. Cl.[7] .................................................. F21V 21/00
[52] U.S. Cl. ........................... 362/288; 362/523; 362/544
[58] Field of Search .................................... 362/496, 523, 362/526, 527, 543, 544, 285, 288

[56] References Cited

U.S. PATENT DOCUMENTS

| | | | |
|---|---|---|---|
| 3,936,131 | 2/1976 | Durand | 339/128 |
| 4,414,614 | 11/1983 | McMahan et al. | 362/523 X |
| 4,747,023 | 5/1988 | Ball et al. | 362/523 |
| 4,899,262 | 2/1990 | Hammond et al. | 362/80 |
| 5,172,972 | 12/1992 | Terano | 362/543 X |
| 5,267,128 | 11/1993 | Shamir et al. | 362/82 |
| 5,833,345 | 11/1998 | Ito | 362/496 X |

*Primary Examiner*—Laura K. Tso
*Attorney, Agent, or Firm*—Donna L. Berry

[57] ABSTRACT

A vehicle fascia assembly includes a main body portion adapted to be interconnected to a frame of a motor vehicle and a horizontally elongated lamp having an inboard end and an outboard end. The lamp, which in one embodiment is a sidemarker lamp, is normally retained in an operative position within an opening in the main body portion of the fascia assembly and is permitted to move relative to the main body portion during an impact to accommodate elastic deformation of the main body portion. In the preferred embodiment, an inboard end of the lamp is interconnected to the main body portion of the fascia assembly through a resiliently deflectable mounting member. The mounting member is preferably constructed of spring steel.

20 Claims, 1 Drawing Sheet

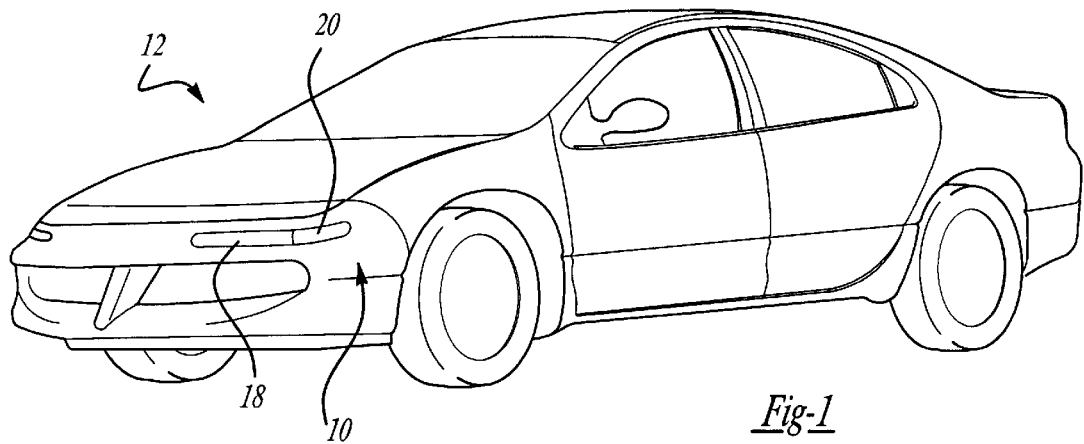
Fig-1
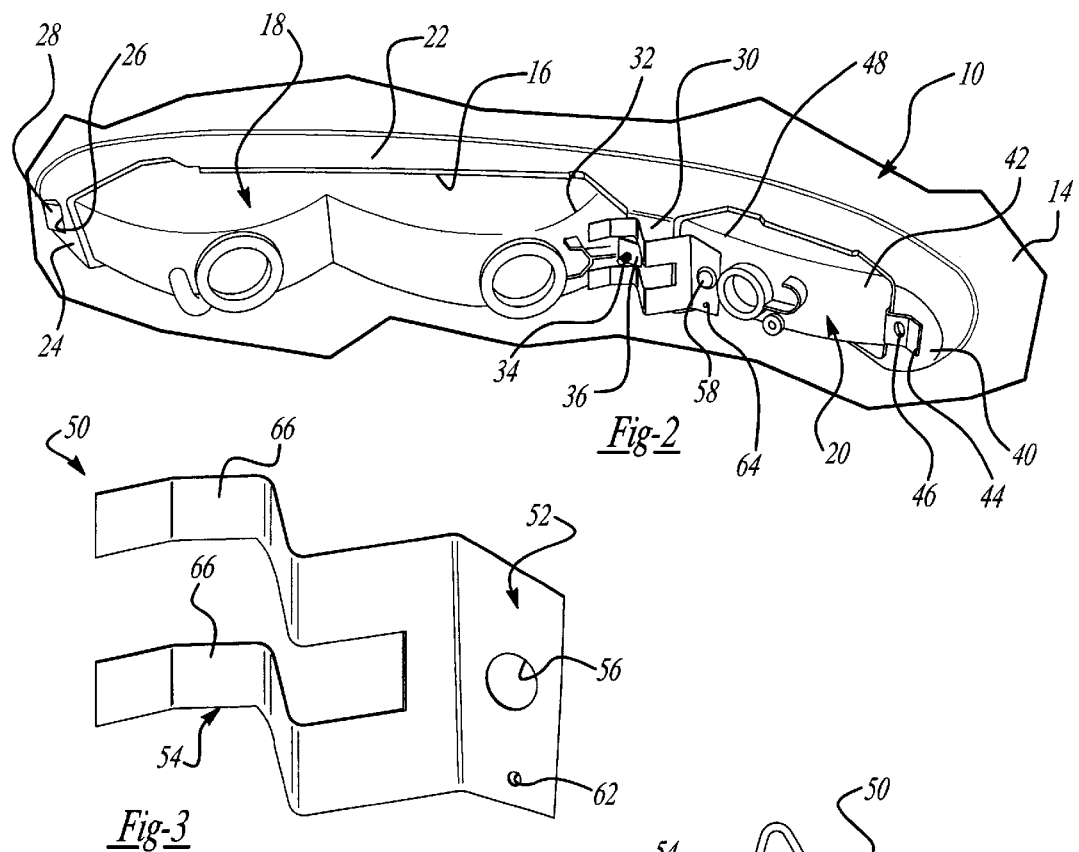
Fig-2
Fig-3
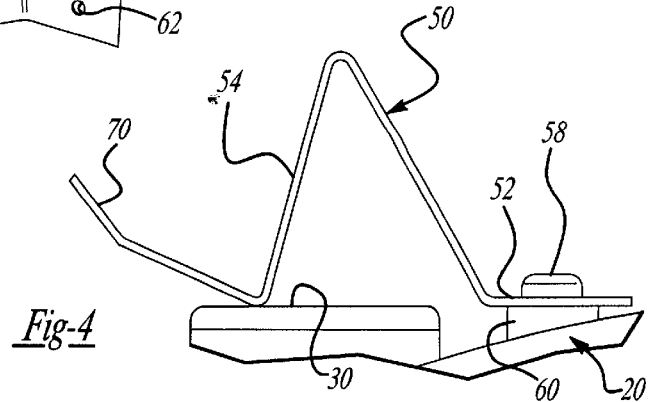
Fig-4

VEHICLE FASCIA ASSEMBLY INCLUDING A MOUNTING MEMBER FOR DEFLECTABLY ATTACHING A LAMP

BACKGROUND OF THE INVENTION

1. Technical Field

The present invention generally relates to motor vehicles. More particularly, the present invention relates to a fascia assembly for a motor vehicle including a deflectably mounted lamp which reduces damage in the event of minor collisions.

2. Discussion

Low speed motor vehicle collisions, commonly referred to as "fender-benders", contribute to a significant amount of vehicle damage resulting in operator expense and inconvenience, as well as increased insurance rates. For example, metal bumpers and body panels are often subjected to inelastic deformation during vehicle collisions which occur at even minimal speeds. Such inelastic deformation typically requires costly repair or replacement by a skilled craftsman.

It is known in the relevant art to incorporate components adapted to withstand lower speed impact without inelastically deforming. For example, various vehicle parts, including front and rear facie, have been constructed of plastic or other suitable material. Among other advantages, deformation of such body panels during low speed impacts (e.g., five to ten miles per hour or less) is frequently limited to elastic deformation. After the impact, the body panels often return to their original shape substantially without evidence of incident.

While the incorporation of elastically deformable parts into vehicles has proven to be effective in reducing damage in the event of low speed collisions, a breakage problem exists with lamps mounted within the fascie that are subjected to elastic deformation. When such a fascia is elastically distorted during an impact, conventional attachment of a lamp to the fascia frequently results in fracture of the lamp which necessitates replacement.

Thus, it is desirable to provide a motor vehicle fascia including a deflectably mounted lamp so as to reduce the likelihood of lamp damage during vehicle impacts occurring at relatively low speeds.

SUMMARY OF THE INVENTION

It is a principal object of the present invention to provide a fascia assembly for a motor vehicle which reduces lamp damage due to low speed collisions.

It is a related object of the present invention to provide an apparatus for mounting a lamp to a motor vehicle fascia such that the apparatus normally retains the lamp in an operative position and further such that the apparatus permits the lamp to move relative to the fascia in response to an impact causing elastic deformation of the fascia.

In one form, the present invention provides a fascia assembly for a motor vehicle having a frame. The fascia assembly includes a main body adapted to be interconnected to the frame. The fascia assembly additionally includes a horizontally elongated lamp having an inboard and an outboard end. The fascia assembly further includes means for mounting one of the inboard and outboard ends of the lamp to the main body portion such that the lamp is normally retained in an operative position, and further such that the one of the inboard and outboard ends is permitted to move relative to the main body portion during an impact to accommodate elastic deformation of the main body portion.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 1 is a perspective view of an exemplary motor vehicle incorporating a fascia assembly constructed in accordance with the teachings of a preferred embodiment of the present invention.

FIG. 2 is a rear perspective view of a portion of the fascia assembly of FIG. 1 shown removed from the motor vehicle for purposes of illustration.

FIG. 3 is a perspective view of the mounting member shown in FIG. 2 illustrated removed from the fascia assembly for purposes of illustration.

FIG. 4 is a fragmentary side view of the mounting member of FIG. 4 illustrated interconnecting the lamp and the fascia.

DETAILED DESCRIPTION OF THE PREFERRED EMBODIMENT

With initial reference to FIG. 1, a fascia assembly constructed in accordance with the teachings of a preferred embodiment of the present invention is generally identified with reference numeral 10. The fascia assembly 10 is shown operatively associated with an exemplary motor vehicle 12. It will become apparent to those skilled in the art that the teachings of the present invention are not limited to the exemplary vehicle 12 illustrated. Further, it will become apparent that the teachings of the present invention are applicable for both front and rear fascie. The main body portion 14 of the fascia assembly 10 is conventionally constructed of plastic or other suitable material capable of elastically deforming during low impact collisions, thereby reducing associated damage.

With continued reference to FIG. 1 and additional reference to FIGS. 2–4, the fascia assembly 10 will be further described. The fascia assembly 10 includes a main body portion or fascia 14 adapted to be attached to the remainder of the vehicle 12 in any of a number of manners well known in the art. In the exemplary embodiment illustrated, the main body portion 14 defines a common horizontally elongated opening 16 adapted to receive a park/turn lamp 18 and a sidemarker lamp 20. In the embodiment illustrated, the park/turn lamp 18 and sidemarker lamp 20 are positioned immediately adjacent one another so as substantially appear as a single continuous lamp.

For purposes of mounting the park/turn lamp 18, the main body portion 14 of the fascia assembly 10 includes a inwardly extending flange 22 surrounding the periphery of the opening 16. An inboard end 24 of the flange 22 inwardly tapers and is formed to include an aperture 26 for receiving a mounting extension 28 carried by the park/turn lamp 18.

The main body portion 14 of the fascia assembly 10 is further formed to include a mounting flange 30 vertically interconnecting upper and lower portions of the flange 22. An outboard end 32 of the park/turn lamp 18 is securely fixed to the flange 30. In this regard, a threaded fastener 34 passes through an aperture (not shown) provided in the park/turn lamp 18 and engages a clip 36 provided on the mounting flange 30.

To facilitate mounting of the sidemarker lamp 20, the main body portion 14 of the fascia assembly 10 further includes a second mounting flange 40 vertically extending between upper and lower portions of the flange 22. An outboard end 42 of the sidemarker lamp 20 is fixedly attached to the second mounting flange 40. In this regard, a clip 44 is provided through which a threaded fastener 46 passes and engages the clip 44.

To provide means for mounting an inboard end 48 of the sidemarker lamp 20 to the main body portion 14 of the fascia assembly 10, the present invention includes a mounting member 50. In the exemplary embodiment illustrated, the mounting member 50 is illustrated as a unitarily formed member constructed from spring steel. The mounting member 50 includes a first end 52 fixedly attached to the sidemarker lamp 20 and a second end 54 resiliently engaging the first mounting flange 30. The second end 54 includes an aperture 56 for receiving a threaded fastener 58. The threaded fastener 58 engages an internal threaded boss portion 60 formed on the sidemarker lamp 20. In certain applications, it may be desirable to provide the fastener 58 with a waxed tip (not shown) to ensure proper sealing of the sidemarker lamp 20. The second end 54 of the mounting member 50 is further formed to include an aperture 62 for receiving a pin 64 extending from the sidemarker lamp 20. The pin 64 functions to prevent rotation of the second end 54 relative to the sidemarker lamp 20.

In the exemplary embodiment illustrated, the second end 54 of the mounting member 50 is shown to include a pair of spaced apart legs 66. As illustrated, both of the pair of spaced apart legs 66 includes a resiliently deflectable V-shaped segment which provides a spring bias force against the first mounting flange 30 for inwardly holding the sidemarker lamp 20 in its operative position (as shown in FIGS. 1 and 2). The second portion 54 further includes an end having an angled distal segment 70 to facilitate assembly.

During assembly, the mounting member 50 is securely fastened to the sidemarker lamp 20 through the fastener 58. Subsequently, the inboard end 48 of the sidemarker lamp 20 is inserted into the opening 16 of the main body portion 14 so that the first mounting flange 30 is captured between the second portion 54 of the mounting member 50 and the sidemarker lamp 20. Next, the outboard end 42 of the lamp 20 is inserted into the opening 16 and fastened to the second mounting flange 40 through the fastener 46.

During certain low-speed vehicle collisions, the fascia assembly 10 is elastically deformed. The mounting member 50 permits the inboard end 48 of the sidemarker lamp 20 to move relative to the first mounting flange 30 and thereby reduce the possibility of lamp breakage. More specifically, during elastic deformation of the main body portion 14 of the fascia assembly 10, the inboard end 48 of the lamp 20 may deflect outwardly against the biasing force of the mounting member 50.

While the above description constitutes the preferred embodiment of the invention, it will be appreciated that the invention is susceptible to modification, variation, and change without departing from the proper scope or fair meaning of the accompanying claims.

We claim:

1. A fascia assembly for a motor vehicle having a frame, the fascia assembly comprising:
   a main body portion adapted to be interconnected to the frame, said main body portion defining a lamp opening;
   a lamp disposed with said lamp opening and having a first end and a second end, said second end of said lamp fixedly attached to said main body portion; and
   a mounting member including a fixed end attached to said lamp and a free end biasing said lamp against a front surface of said main body portion.

2. The fascia assembly for a motor vehicle of claim 1, wherein said mounting member is an elastically deformable mounting member.

3. The fascia assembly for a motor vehicle of claim 1, wherein said free end abuts a rear surface of said main body portion.

4. The fascia assembly for a motor vehicle of claim 3, wherein said main body portion includes a first mounting flange and a second mounting flange, said second end of said lamp fixedly attached to said second mounting flange.

5. The fascia assembly for a motor vehicle of claim 4, wherein said mounting member abuts said first mounting flange.

6. The fascia assembly for a motor vehicle of claim 1, wherein said mounting member is operative to permit said first end of said lamp to outwardly deflect relative to said main body portion in response to elastic deformation of said main body portion.

7. The fascia assembly for a motor vehicle of claim 1, wherein said mounting member is unitarily constructed of spring steel.

8. A fascia assembly for a motor vehicle having a frame, the fascia assembly comprising:
   a main body portion adapted to be interconnected to the frame, the main body portion defining an elongated opening and including first and second mounting flanges;
   a sidemarker lamp having an inboard end and an outboard end, said sidemarker lamp operatively disposed within said elongated opening, said outboard end being fixedly attached to said second mounting flange; and
   a mounting member interconnecting said lamp and said first mounting flange such that said lamp is normally retained in an operative position and further such that said inboard end is permitted to move relative to said main body portion during an impact to accommodate elastic deformation of said main body portion.

9. The fascia assembly for a motor vehicle of claim 8, wherein said mounting member is elastically deformable.

10. The fascia assembly for a motor vehicle of claim 8, wherein said mounting member includes a first end fixedly attached to said sidemarker lamp and a second end resiliently engaging said first mounting flange.

11. The fascia assembly for a motor vehicle of claim 8, wherein said second end includes a pair of spaced apart legs.

12. The fascia assembly for a motor vehicle of claim 11, wherein said first end includes a first aperture through which a threaded fastener passes and engages said sidemarker lamp and a second aperture, said sidemarker lamp including a post inserted into said second aperture to prevent rotation of said mounting member relative to said inboard end.

13. The fascia assembly for a motor vehicle of claim 8, wherein said mounting member is operative to permit outward deflection of said inboard end of said sidemarker lamp in response to elastic deformation of said main body portion.

14. The fascia assembly for a motor vehicle of claim 8, wherein said mounting member is unitarily constructed of spring steel.

15. A fascia assembly for a motor vehicle having a frame, the fascia assembly comprising:
   a main body portion adapted to be interconnected to the frame and defining an elongated opening and including first and second mounting flanges;
   a park/turn lamp disposed within said elongated opening, said park/turn lamp being secured to said first mounting flange;

a sidemarker lamp disposed within said elongated opening on an outboard side of said park/turn lamp, said sidemarker lamp fixedly attached to one of said first and second mounting flanges; and a mounting member interconnecting said sidemarker lamp and said other of said first and second mounting flanges such that said mounting member normally retains said sidemarker lamp in an operative position and permits said sidemarker lamp to move relative to said other of said first and second mounting flanges in response to an impact causing elastic deformation of said main body portion.

16. The fascia assembly for a motor vehicle of claim 15, wherein said mounting member is elastically deformable.

17. The fascia assembly for a motor vehicle of claim 16, wherein said mounting member includes a first end rigidly attached to said sidemarker lamp and a second end deflectably engaging said other of said first and second mounting flanges.

18. The fascia assembly for a motor vehicle of claim 17, wherein said mounting member interconnects an inboard end of said sidemarker lamp with said first mounting flange.

19. The fascia assembly for a motor vehicle of claim 18, wherein said second end of said mounting member includes a pair of spaced apart legs.

20. The fascia assembly for a motor vehicle of claim 15, wherein said mounting member is unitarily constructed of spring steel.

* * * * *